United States Patent
Veltri

(10) Patent No.: US 8,803,363 B2
(45) Date of Patent: Aug. 12, 2014

(54) METHOD AND SYSTEM FOR REGULATING POWER OF AN ELECTRICITY GRID SYSTEM

(71) Applicant: Temporal Power Ltd., Mississauaga (CA)

(72) Inventor: Jeffrey Allan Veltri, Mississauga (CA)

(73) Assignee: Temporal Power Ltd., Mississauga (CA)

( * ) Notice: Subject to any disclaimer, the term of this patent is extended or adjusted under 35 U.S.C. 154(b) by 0 days.

(21) Appl. No.: 13/863,727

(22) Filed: Apr. 16, 2013

(65) Prior Publication Data

US 2013/0270914 A1 Oct. 17, 2013

Related U.S. Application Data

(60) Provisional application No. 61/624,648, filed on Apr. 16, 2012.

(51) Int. Cl.
H02J 3/30 (2006.01)
H02J 3/28 (2006.01)
H02J 3/32 (2006.01)

(52) U.S. Cl.
CPC ... *H02J 3/30* (2013.01); *H02J 3/28* (2013.01); *H02J 3/32* (2013.01); *Y02B 90/222* (2013.01); *Y04S 10/12* (2013.01); *Y04S 20/12* (2013.01); *Y02E 60/16* (2013.01)
USPC .............. 307/87; 307/47; 307/48; 307/82; 307/85; 307/86

(58) Field of Classification Search
CPC .................. H02J 3/28; H02J 3/30; H02J 3/32
USPC .................................... 307/47–48, 82, 85–87
See application file for complete search history.

(56) References Cited

U.S. PATENT DOCUMENTS 2,894,155 A   7/1959  Labastie
3,514,625 A   5/1970  Lane
(Continued)

FOREIGN PATENT DOCUMENTS

AU   2004305778 A1   3/2005
AU   2011200041 A1   1/2011
(Continued)

OTHER PUBLICATIONS

McElligott, "Flywheels Set to Help Regulate on the U.S. Grid", TechSurveillance Magazine, Cooperative Research Network, Nov. 20, 2010, 7 pages.*

(Continued)

*Primary Examiner* — Adi Amrany
(74) *Attorney, Agent, or Firm* — Sterne, Kessler, Goldstein & Fox P.L.L.C.

(57) ABSTRACT

A power regulation system for an electrical grid has a store of electrical energy connected through a first switch to a source of electrical energy. The response time of the store is faster than that of the source. A second switch is connected to the store at one side with the opposite side for connection to the grid. A first controller monitors energy stored in the store and energy available from said source and selectively controls the first switch to close to transfer energy from the source to the store. A second controller monitors energy stored in said store and, on receiving an indication that additional energy is needed in the grid, if the energy stored in the store exceeds a supply threshold, controls the second switch to close to transfer energy from the store to the grid.

21 Claims, 4 Drawing Sheets

(56) References Cited

U.S. PATENT DOCUMENTS

| | | |
|---|---|---|
| 3,665,495 A * | 5/1972 | Carter et al. .................... 307/67 |
| 3,667,012 A * | 5/1972 | Kilgore ........................ 318/161 |
| 4,001,666 A | 1/1977 | Grenfell |
| 4,221,452 A | 9/1980 | Remington |
| 4,223,240 A | 9/1980 | Theyse |
| 4,434,393 A * | 2/1984 | Kobari et al. .................. 318/757 |
| 4,511,190 A | 4/1985 | Caye et al. |
| 4,563,046 A | 1/1986 | Shimamoto |
| 4,566,740 A | 1/1986 | Beau et al. |
| 4,620,272 A * | 10/1986 | Fulton et al. .................... 363/53 |
| 4,700,094 A | 10/1987 | Downer et al. |
| 4,723,735 A | 2/1988 | Eisenhaure et al. |
| 4,785,212 A | 11/1988 | Downer et al. |
| 5,057,697 A | 10/1991 | Hammond et al. |
| 5,124,605 A | 6/1992 | Bitterly et al. |
| 5,126,610 A | 6/1992 | Fremerey |
| 5,250,865 A | 10/1993 | Meeks |
| 5,329,222 A | 7/1994 | Gyugyi et al. |
| 5,449,989 A | 9/1995 | Correa et al. |
| 5,541,460 A | 7/1996 | Dunfield et al. |
| 5,614,777 A | 3/1997 | Bitterly et al. |
| 5,619,083 A | 4/1997 | Dunfield et al. |
| 5,635,770 A | 6/1997 | Evans, Jr. et al. |
| 5,699,666 A | 12/1997 | Kurten et al. |
| 5,708,312 A | 1/1998 | Rosen et al. |
| 5,759,589 A | 6/1998 | George, Jr. |
| 5,760,506 A | 6/1998 | Ahlstrom et al. |
| 5,763,971 A | 6/1998 | Takahata et al. |
| 5,780,980 A | 7/1998 | Naito |
| 5,798,633 A | 8/1998 | Larsen et al. |
| 5,821,651 A | 10/1998 | Lansberry et al. |
| 5,847,480 A | 12/1998 | Post |
| 5,894,181 A | 4/1999 | Imlach |
| 5,912,519 A | 6/1999 | Horner et al. |
| 5,917,251 A | 6/1999 | Schermann et al. |
| 5,920,138 A | 7/1999 | Clifton et al. |
| 5,921,505 A | 7/1999 | Spector |
| 5,932,935 A | 8/1999 | Clifton et al. |
| 5,939,102 A | 8/1999 | George, Jr. |
| 5,942,825 A | 8/1999 | Lee |
| 5,945,754 A | 8/1999 | Fulwood et al. |
| 5,969,457 A | 10/1999 | Clifton et al. |
| 5,994,794 A * | 11/1999 | Wehrlen ........................ 307/66 |
| 5,998,899 A | 12/1999 | Rosen et al. |
| 6,019,319 A | 2/2000 | Falbel |
| 6,023,152 A * | 2/2000 | Briest et al. .................... 323/207 |
| 6,134,124 A * | 10/2000 | Jungreis et al. ................. 363/34 |
| 6,144,128 A | 11/2000 | Rosen |
| 6,166,472 A | 12/2000 | Pinkerton et al. |
| 6,169,390 B1 * | 1/2001 | Jungreis ........................ 322/4 |
| 6,175,166 B1 * | 1/2001 | Bapat .......................... 307/64 |
| 6,215,202 B1 | 4/2001 | Luongo et al. |
| 6,227,817 B1 | 5/2001 | Paden |
| 6,231,011 B1 | 5/2001 | Chu et al. |
| 6,262,505 B1 | 7/2001 | Hockney et al. |
| 6,268,674 B1 | 7/2001 | Takahashi |
| 6,304,015 B1 | 10/2001 | Filatov et al. |
| 6,347,925 B1 | 2/2002 | Woodard et al. |
| 6,388,347 B1 | 5/2002 | Blake et al. |
| 6,441,581 B1 | 8/2002 | King et al. |
| 6,448,679 B1 | 9/2002 | Imlach |
| 6,464,472 B1 | 10/2002 | Sekiguchi et al. |
| 6,522,031 B2 | 2/2003 | Provanzana et al. |
| 6,566,775 B1 | 5/2003 | Fradella |
| 6,570,286 B1 | 5/2003 | Gabrys |
| 6,583,528 B2 | 6/2003 | Gabrys |
| 6,585,490 B1 | 7/2003 | Gabrys et al. |
| 6,614,132 B2 | 9/2003 | Hockney et al. |
| 6,624,532 B1 | 9/2003 | Davidow et al. |
| 6,624,542 B1 | 9/2003 | Gabrys et al. |
| 6,630,761 B1 | 10/2003 | Gabrys |
| 6,664,680 B1 | 12/2003 | Gabrys |
| 6,675,872 B2 | 1/2004 | Lewis et al. |
| 6,700,258 B2 | 3/2004 | McMullen et al. |
| 6,703,735 B1 | 3/2004 | Gabrys |
| 6,710,489 B1 | 3/2004 | Gabrys |
| 6,727,617 B2 | 4/2004 | McMullen et al. |
| 6,737,762 B2 * | 5/2004 | Koenig ........................ 307/48 |
| 6,741,007 B2 | 5/2004 | Frash et al. |
| 6,747,378 B2 | 6/2004 | Brackett |
| 6,806,605 B1 | 10/2004 | Gabrys |
| 6,817,266 B1 | 11/2004 | Brackett |
| 6,824,861 B2 | 11/2004 | Spears |
| 6,825,588 B2 | 11/2004 | Gabrys et al. |
| 6,852,401 B2 | 2/2005 | Spears et al. |
| 6,882,072 B2 | 4/2005 | Wingett et al. |
| 6,882,904 B1 | 4/2005 | Petrie et al. |
| 6,884,039 B2 | 4/2005 | Woodard et al. |
| 6,897,587 B1 | 5/2005 | McMullen et al. |
| 6,914,349 B2 * | 7/2005 | Rajagopalan .................. 307/65 |
| 6,959,756 B2 | 11/2005 | Woodard et al. |
| 6,980,891 B2 | 12/2005 | Nagafuchi et al. |
| 6,995,529 B2 | 2/2006 | Sibley |
| 7,034,420 B2 | 4/2006 | Brackett et al. |
| 7,052,253 B2 | 5/2006 | Izraelev |
| 7,053,589 B2 | 5/2006 | Gabrys et al. |
| 7,071,581 B2 * | 7/2006 | Eisenhaure et al. ............ 307/64 |
| 7,174,806 B2 | 2/2007 | Brackett et al. |
| 7,197,958 B2 | 4/2007 | Brault et al. |
| 7,343,361 B2 | 3/2008 | Peljto et al. |
| 7,358,620 B2 * | 4/2008 | Melfi ............................ 290/1 A |
| 7,365,461 B2 | 4/2008 | Brackett et al. |
| 7,416,039 B1 | 8/2008 | Anderson et al. |
| 7,566,990 B2 * | 7/2009 | Loucks et al. .................. 307/64 |
| 7,679,245 B2 | 3/2010 | Brackett et al. |
| 7,679,247 B2 | 3/2010 | Wang |
| 7,715,951 B2 | 5/2010 | Forbes, Jr. et al. |
| 7,786,616 B2 * | 8/2010 | Naden et al. .................... 307/64 |
| 7,830,055 B2 | 11/2010 | Arseneaux et al. |
| 7,834,479 B2 | 11/2010 | Capp et al. |
| 7,847,423 B1 | 12/2010 | Farkas |
| 8,008,804 B2 | 8/2011 | Capp et al. |
| 8,030,787 B2 | 10/2011 | Kalev |
| 8,102,144 B2 | 1/2012 | Capp et al. |
| 8,314,527 B2 | 11/2012 | Wang |
| 8,343,603 B2 | 1/2013 | Negle |
| 8,669,675 B2 | 3/2014 | Capp et al. |
| 2002/0041126 A1 | 4/2002 | Provanzana et al. |
| 2003/0010037 A1 | 1/2003 | Vugdelija |
| 2003/0155831 A1 | 8/2003 | Gabrys et al. |
| 2003/0160595 A1 | 8/2003 | Provanzana et al. |
| 2003/0225483 A1 | 12/2003 | Santinato et al. |
| 2004/0126635 A1 | 7/2004 | Pearson |
| 2004/0135436 A1 * | 7/2004 | Gilbreth et al. ................ 307/18 |
| 2004/0150374 A1 | 8/2004 | Kraus |
| 2005/0035744 A1 | 2/2005 | Potter et al. |
| 2005/0150323 A1 | 7/2005 | Spears |
| 2007/0014980 A1 | 1/2007 | Spears |
| 2007/0103009 A1 | 5/2007 | Yang |
| 2008/0315696 A1 | 12/2008 | Wang |
| 2010/0237629 A1 | 9/2010 | Gray |
| 2010/0264759 A1 | 10/2010 | Shafer et al. |
| 2011/0175371 A1 * | 7/2011 | Gray ............................ 290/1 R |
| 2011/0278853 A1 * | 11/2011 | Capp et al. .................... 290/1 A |
| 2011/0298293 A1 | 12/2011 | Veltri |
| 2012/0056483 A1 | 3/2012 | Capp et al. |
| 2012/0065805 A1 * | 3/2012 | Montalvo ...................... 700/297 |
| 2013/0002064 A1 | 1/2013 | De Bock et al. |
| 2013/0009476 A1 * | 1/2013 | Solis et al. .................... 307/46 |
| 2013/0009477 A1 * | 1/2013 | Delattre et al. ................ 307/46 |
| 2013/0043750 A1 | 2/2013 | Wang |

FOREIGN PATENT DOCUMENTS

| | | |
|---|---|---|
| BR | PI 0413598-9 A | 10/2006 |
| BX | 2 801 307 A1 | 12/2011 |
| CA | 2 535 458 A1 | 3/2005 |
| CA | 2 813 020 A1 | 10/2013 |
| CN | 103038541 A | 4/2013 |
| EP | 0 235 555 B1 | 5/1992 |
| EP | 0 291 742 B1 | 2/1993 |
| EP | 0 872 942 A2 | 10/1998 |
| EP | 1 271 741 A2 | 1/2003 |
| EP | 1 394 928 A3 | 9/2004 |

(56) References Cited

FOREIGN PATENT DOCUMENTS

| | | |
|---|---|---|
| EP | 1 171 946 B1 | 8/2006 |
| EP | 1 275 822 B1 | 5/2009 |
| EP | 2 330 726 A2 | 6/2011 |
| JP | 6-284583 A | 10/1994 |
| JP | 2000-14013 A | 1/2000 |
| JP | 2007-503191 A | 2/2007 |
| JP | 2013-531452 A | 8/2013 |
| KR | 10-2013-0121703 A | 11/2013 |
| MX | 2012014398 A | 6/2013 |
| WO | WO 98/43341 A1 | 10/1998 |
| WO | WO 99/13553 A1 | 3/1999 |
| WO | WO 99/50945 A1 | 10/1999 |
| WO | WO 01/17092 A1 | 3/2001 |
| WO | WO 02/03523 A2 | 1/2002 |
| WO | WO 02/097945 A2 | 12/2002 |
| WO | WO 02/103879 A1 | 12/2002 |
| WO | WO 03/023224 A1 | 3/2003 |
| WO | WO 2005/029667 A2 | 3/2005 |
| WO | WO 2011/090511 | 7/2011 |
| WO | WO 2011/153612 A2 | 12/2011 |
| WO | WO 2013/096946 A1 | 6/2013 |
| WO | WO 2013/155598 A1 | 10/2013 |

OTHER PUBLICATIONS

Athay, Thomas M., Generation Scheduling and Control, Proceedings of the IEEE, vol. 75, No. 12.

Dec. 1987 Energy Storage Council (ESC), Energy Storage: The Missing Link in the Electricity Value Chain, The Energy Storage Council (ESC) (2002).

International Search Report and Written Opnion of the International Searching Authority for International Application No. PCT/CA2013/000359, mailed on Aug. 29. 2013, 9 pages.

Aditya, S.K. et al., "Battery energy storage for load frequency control of an interconnected power system," Electric Power Systems Research 58, pp. 179-185, Feb. 2001.

Akagi, H., "Active filters and energy storage systems operated under non-periodic conditions," Power Engineering Society Summer Meeting, 2000, IEEE, vol. 2, 16-20, pp. 965-970, Jul. 2000.

Akhil, A. et al., "Cost Analysis of Energy Storage Systems for Electric Utility Applications," Sandia National Laboratories, 62 pages, Feb. 1997.

Bender, D. A. et al., "DC Power Management with a High Performance Flywheel," AFS Trinity Power Corporation, EESAT 2002 Conference, 4 pages, Apr. 2002.

Bender, D. A. et al., "DC Power Management with a High Performance Flywheel," AFS Trinity Power Corporation, EESAT 2002 Conference, 12 pages, Apr. 2002.

Bhatnager, D. et al., "Market and Policy Barriers to Energy Storage Deployment," Sandia National Laboratories, 58 pages, Sep. 2013.

Bornemann, H.J. et al., "Conceptual system design of a 5 MWh/100 MW superconducting flywheel energy storage plant for power utility applications," IEEE Transactions on Applied Superconductivity, vol. 7, Issue 2, Part 1, pp. 398-401, Jun. 1997.

Bose, A. et al., "Impact of New Energy Technologies on Generation Scheduling," IEEE Transactions on Power Apparatus and Systems, vol. PAS-103, No. 1, pp. 66-71, Jan. 1984.

Butler, P., et al., "Energy Storage Opportunities Analysis Phase II Final Report a Study for the DOE Energy Storage Systems Program," Sandia National Laboratories, 60 pages, May 2002.

Butler, P.C., "Battery Energy Storage for Utility Applications: Phase I—Opportunities Analysis," Sandia National Laboratories, 69 pages, Oct. 1994.

Canadian Office Action for Application No. CA 2,525,458, dated Jan. 27, 2014.

"Chino Battery Energy Storage Power Plant: First Year of Operation," Bechtel Group, Inc., 236 pages, Dec. 1992.

Cook, G.M. et al., "Overview of Battery Power Regulation and Storage," IEEE Transactions on Energy Conversion, vol. 6, No. 1, pp. 204-211, Mar. 1991.

Day, A.C. et al., "Flywheels with All-Passive, Non-Contact Magnetic Suspensions," presentation, Boeing Phantom Works, EESAT 2002 Conference, 18 pages, Apr. 2002.

Day, A.C. et al., "Flywheels with All-Passive, Non-Contact Magnetic Suspensions," Boeing, EESAT 2002 Conference, 6 pages, Apr. 2002.

European Search Report Issued in European Application No. 04809577.2, 3 pages, dated Feb. 22, 2012.

Gordon, S.P. et al., eds., "The Emerging Roles of Energy Storage in a Competitive Power Market: Summary of a DOE Workshop," Sandia National Laboratories, 78 pages, Jun. 1995.

Hampton, D. F. at al., "Emergency control of power system frequency using and flywheel energy injection," Advances in Power System Control, Operation and Management, APSCOM-91, pp. 662-666, Nov. 1991.

Hearn, C.S. et al., "Low cost Flywheel Energy Storage for a Fuel Cell Powered Transit Bus," Vehicle Power and Propulsion Conference, 8 pages, Sep. 9-12, 2007.

Hebner, R. et al., "Flywheel Batteries Come Around Again," IEEE Spectrum, pp. 46-51, Apr. 2002.

Higgins, M.A. et al., "Flywheel Energy Storage for Electric Utility Load Leveling," Proc. of the 26th Intersociety Energy Conversion Engineering Conference, vol. 4, pp. 209-214, Aug. 1991.

Hockney, R. et al., "Powering of Remote Node Locations Using Flywheel Energy Storage," IEEE, 18th International Telecommunications Energy Conference, pp. 662-667, Oct. 1996.

Hockney, R. et al., "Powering of Standby Power Supplies Using Flywheel Energy Storage," IEEE, pp. 105-109, 1997.

International Search Report and Written Opinion of the International Searching Authority for International Application No. PCT/CA2013/050840, 8 pages, mailed on Jan. 30, 2014.

International Search Report for Application No. PCT/US04/26721, 2 pages, mailed Nov. 1, 2005.

International Search Report from PCT Application No. PCT/CA2011/000641, 2 pages, mailed Oct. 4, 2011.

Jiancheng, Z., et al., "Research on Flywheel Energy Storage System for Power Quality," IEEE, pp. 496-499, 2002.

Kirby, B.J., "Frequency Regulation Basics and Trends," Oak Ridge National Laboratory, U.S. Department of Energy, 32 pages, Dec. 2004.

Kottick, D. et al., "Battery Energy Storage for Frequency Regulation in an Island Power System," IEEE Transactions on Energy Conversion, vol. 8, No. 3, pp. 455-459, Sep. 1993.

Kunisch, H.J. et al., "Battery Energy Storage: Another Option for Load-Frequency-Control and Instantaneous Reserve," IEEE Transactions on Energy Conversion, vol. EC-1, No. 3, pp. 41-46, Sep. 1986.

Lazarewicz, M., "A Description of the Beacon Power High Energy and High Power Composite Flywheel Energy Storage System," presentation, EESAT 2002 Conference, 23 pages, Apr. 2002.

Lazarewicz, M., "A Description of the Beacon Power High Energy and High Power Composite Flywheel Energy Storage Systems," EESAT 2002 Conference, 6 pages, Apr. 2002.

Lazarewicz, M.L. et al., "Grid Frequency Regulation by Recycling Electrical Energy in Flywheels," Beacon Power, 5 pages, 2004.

Lazarewicz, M.L. et al., "Status of Pilot Projects Using Flywheels for Frequency Regulation," IEEE, 3 pages, 2006.

Lu, C.F. et al., "Effect of Battery Energy Storage System on Load Frequency Control Considering Governor Deadband and Generation Rate Constraint," IEEE Transactions on Energy Conversion, vol. 10, No. 3, pp. 553-561, Sep. 1995.

Lyons, P., "Energy Storage for Power Systems with Rapidly Changing Loads," pp. 1-112, Purdue University, available at http://does.lib.purdue.edu/cgi!viewcontent.cgi?article=1266&context—ecetr, Dec. 2002.

Mack, D.R., "Something new in power technology," IEEE Potentials, pp. 40-42, Apr. 1993.

Makansi, J. et al., "Energy Storage: The Missing Link in the Electricity Value Chain," Energy Storage Council, 23 pages, May 2002.

Mrugowsky, H. et al., "Investigation of the stability of a 600 MJ energy storage system based on paralleled flywheel generators," presentation, EESAT 2002 Conference, 25 pages, Apr. 2002.

(56) References Cited

OTHER PUBLICATIONS

Park, J.D., "Simple Flywheel Energy Storage using Squirrel-Cage Induction Machine for DC Bus Microgrid Systems," IECON 2010—36th Annual Conference on IEEE Industrial Electronics Society, pp. 3040-3045, Nov. 2010.

Rabenhorst, D.W. et al., "Low-Cost Flywheel Demonstration Program," The Johns Hopkins University, Applied Physics Laboratory, 108 pages, Apr. 1980.

Ribeiro, P.F. et al., "Energy Storage Systems for Advanced Power Applications," Proceedings of the IEEE, vol. 89, No. 12, pp. 1744-1756, Dec. 2001.

Richey, S., "Cleansource2 Battery-Free Energy Storage Theory of Operation," 5 pages, 2002.

Richey. S., "Cleansource2 Battery-Free Energy Storage Theory of Operation," presentation , Active Poer, EESAT 2002 Conference, 22 pages, 2002.

Rojas, A., "Flywheel Energy Matrix Systems—Today's Technology, Tomorrow's Energy Storage Solution," Beacon Power Corp, 10 pages, 2003.

Sasaki, T. et al., "Study on Load Frequency Control Using Redox Flow Batteries," IEEE Transactions on Power Systems, vol. 19, No. 1, pp. 660-667, Feb. 2004.

Sears, J.R., "TEX: The Next Generation of Energy Storage Technology," IEEE, 11-3, pp. 218-222, 2004.

Sen, U., "Battery Energy Storage for Load Frequency Control of an Interconnected Power System," Delhi Technological University, 73 pages, Jun. 2011.

Symons, P.C., "Opportunities for Energy Storage in Stressed Electricity Supply Systems," IEEE, pp. 448-449, 2001.

Tarrant, C., "Revolutionary flywheel energy storage system for quality power," Power Engineering Journal, pp. 159-163, Jun. 1999.

Townley, D., "Introducing Pentadyne Power Flywheel Energy Storage System," Pentadyne Power Corporation, EESAT 2002 Conference, 4 pages, Apr. 2002.

Townley, D., "Performance and Application of the Pentadyne Flywheel System," presentation, Pentadyne Power Corporation, EESAT 2002 Conference, 24 pages, Apr. 2002.

Van Der Linden, S., "The Commercial World of Energy Storage: A Review of Operating Facilities," presentation, 1st Annual Conference of the Energy Storage Council, 51 pages, Mar. 2003.

Wagner, R. et al., "Flywheel Technology Development At the NASA Glenn Research Center," University of Toledo, NASA Glenn Research Center, EESAT 2002 Conference, 6 pages, Apr. 2002.

Wagner, R. et al., "Flywheel Technology Development At the NASA Glenn Research Center," presentation, University of Toledo, NASA Glenn Research Center, EESAT 2002 Conference, 17 pages, Apr. 2002.

Zarzour, M. et al., "Experimental Evaluation of a Metal Mesh Bearing Damper," Transactions of the ASME, vol. 122, pp. 326-329, Apr. 2000.

English Language Abstract of Japanese Patent Publication No. 06-284583 A, Japanese Patent Office, Patent Abstracts of Japan, Oct. 1994 (listed as document FP3 on the accompanying form PTO/SB/08A).

English Language Abstract of Japanese Patent Publication No. 2000-014013 A, Japanese Patent Office, Patent Abstracts of Japan, Jan. 2000 (listed as document FP8 on the accompanying form PTO/SB/08A).

\* cited by examiner

METHOD AND SYSTEM FOR REGULATING POWER OF AN ELECTRICITY GRID SYSTEM

BACKGROUND

The present invention relates to methods and systems for regulating power in an electricity grid system.

As is well known in the art an AC electricity grid system is organized as a grid or network that interconnects multiple power generating facilities with multiple loads. The grid is typically geographically diverse and is subdivided into smaller geographic areas for regulation of the power. The generating capability and the loads may vary with time and the operation of the grid must be controlled to keep the power distributed—especially the voltage and frequency—within defined characteristics.

If supply is less than demand, the frequency decreases and if supply is greater than demand, frequency increases. As a result, frequency regulation is an important part of the normal operation of modern AC electricity grids and has historically been accomplished by adjusting classic generation sources (such as hydro, gas or coal power generators) up or down to match the total demand. Independent System Operators (ISOs) are responsible for monitoring their geographic area and ensuring that the mismatch between supply and demand remains small. To do this, the ISOs monitor the total inflows and outflows from their area, the total being generated, and the total demand (or load). The ISOs use this information to determine if more or less power needs to be generated and sends a control signal to the generators under their control. As a result, the AC frequency of the entire system is managed during both regular operation (customers increasing/decreasing their demand) and emergency conditions (when a generator trips out due to a fault).

The IEEE publication "Generation Scheduling and Control", Thomas M Athay, Proceedings of the IEEE, Vol. 75, No. 12, December 1987, provides a summary of how power generation control and frequency regulation are accomplished on most conventional AC electricity grids. The overall objective is to control the electrical power generator units so as to supply the continuously changing customer power demand in an economical manner. This task is undertaken by an Automatic Generation Control (AGC) program operating within the ISOs. Much of the associated functionality is provided by an AGC program operating within a control center computer. In very general terms, the AGC monitors the current state of the AC electricity grid (typically voltage and frequency) and outputs regulation signals for controlling each generation unit to keep the voltage and frequency within acceptable limits. An essential aspect of an interconnected system is that all available generators in the system respond to changes in frequency, via their governor speed control mechanisms and their AGC regulation signals, to bring the frequency to a new steady state, thereby balancing total system generation to total system load.

A limitation of conventional AGC regulation methods is that generation units (e.g. hydro-electric, steam-turbine, diesel etc.) frequently have a response time of several seconds, whereas total system load can vary (due to customers connecting and disconnecting loads to and from the grid) much more rapidly. Consequently, it can be very difficult for conventional AC electricity grids to track short-period variations in total system load. The result is that the frequency and voltage in the AC electricity grid will typically fluctuate in time, and the AGC system will operate to constrain these fluctuations to a predetermined range.

The publication "Energy Storage: The Missing Link in the Electricity Value Chain" by the Energy Storage Council (ESC) (2002), proposes the use of grid-connected energy storage systems which operate to supply and absorb power to and from the grid to enable improved frequency regulation in the distribution grid. As noted in the ESC paper, energy storage systems such flywheels and batteries are capable of responding to system load changes (or, equivalently, AGC regulation signals) more rapidly than conventional power generation units, which enables more accurate frequency regulation in the grid.

While the use of grid-connected energy storage systems enables improved frequency regulation relative to conventional AGC methods, further improvements are desirable.

SUMMARY

A power regulation system for an electrical grid has a store of electrical energy connected through a first switch to a source of electrical energy. The response time of the store is faster than that of the source. A second switch is connected to the store at one side with the opposite side for connection to the grid. A first controller monitors energy stored in the store and energy available from said source and selectively controls the first switch to close to transfer energy from the source to the store. A second controller monitors energy stored in said store and, on receiving an indication that additional energy is needed in the grid, if the energy stored in the store exceeds a supply threshold, controls the second switch to close to transfer energy from the store to the grid.

In an embodiment, a system for frequency regulation in an AC electricity grid has a set of one or more power regulation units for connection to the grid. Each power regulation unit has a variable frequency AC source/sink, a capacitor array acting as a DC energy store, a variable frequency AC/DC power converter coupled between the AC source/sink and the capacitor array, and a variable frequency AC/DC power converter connected between the capacitor array and the AC electricity grid. A first converter controller is configured to control the power converter between the grid and capacitor array to control bi-directional flows of electrical power between the capacitor array and the AC electricity grid. A second converter controller is configured to control the power converter between the source/sink and the capacitor array to control energy flow between the AC source/sink and the capacitor array.

In an aspect, there is provided a power regulation system for an electrical grid comprising: a store of electrical energy; a source of electrical energy, wherein an energy supply response time of the store is faster than that of the supply; a first switch connecting said store to said source; a second switch connected to the store at one side and having an opposite side for connection to the grid; a first controller for monitoring energy stored in the store and energy available from said source and for selectively controlling the first switch to close to transfer energy from the source to the store; a second controller for monitoring energy stored in said store and, on receiving an indication that additional energy is needed in the grid, if the energy stored in the store exceeds a supply threshold, controlling the second switch to close to transfer energy from the store to the grid.

In another aspect, there is provided a power regulation system for an AC grid, comprising: a capacitive store able to supply energy on command within a first response time; a first switch connected at one side to said capacitive store and for connection, at an opposite side, to a kinetic battery able, at least intermittently, to supply energy on command within a second response time, said first response time being faster than said second response time; a second switch comprising a power inverter, said second switch connected at one side to said capacitive store and for connection at an opposite side to said AC grid; a first controller connected to monitor voltage of said capacitive store and energy available from said kinetic battery and for, where said voltage of said capacitive store falls below a lower threshold and said kinetic battery has available energy, controlling said first switch to close to transfer energy from said kinetic battery to said capacitive store; a second controller connected to monitor voltage of said capacitive store and intermittently receiving a request to supply additional energy to said grid, said second controller for, on receiving a request to supply additional energy to said grid, where voltage of said capacitive store exceeds a supply threshold, controlling said second switch to close to transfer energy from said capacitive store through said power inverter to said AC grid.

In a further aspect, there is provided a power regulation system for an electrical grid, comprising: a store of electrical energy able to supply energy on command within a first response time; a first switch connected at one side to said store of electrical energy and for connection, at an opposite side, to a source of electrical energy able, at least intermittently, to supply energy on command within a second response time, said first response time being faster than said second response time; a second switch connected at one side to said store and for connection at an opposite side to said electrical grid; a first controller for monitoring energy stored in said store and energy available from said source and for, where said indication of energy stored in said store falls below a lower threshold and said source has available energy, controlling said first switch to close to transfer energy from said source to said store; a second controller for monitoring energy stored in said store and for receiving an indication of at least one characteristic of power in said grid and for, where said at least one characteristic of power in said grid indicates a need for additional energy in said grid and energy stored in said store exceeds a supply threshold, controlling said second switch to close to transfer energy from said store to said grid.

In a yet further aspect, there is provided a method for regulating power on a grid comprising: (a) in a first process: (i) monitoring energy stored in a store and energy available from a source; (ii) where said indication of energy stored in said store falls below a lower threshold and said source has available energy, transferring energy from said source to said store; (b) in a second process independent of said first process: (i) monitoring energy stored in said store; and (ii) on receiving an indication of a need for additional energy in said grid, if energy stored in said store exceeds a supply threshold, transferring energy from said store to said grid.

BRIEF DESCRIPTION OF THE DRAWINGS

Further features and advantages of the present invention will become apparent from the following detailed description, by way of example only, taken in combination with the appended drawings, in which.

It will be noted that throughout the appended drawings, like features are identified by like reference numerals.

DETAILED DESCRIPTION

Figure 1:
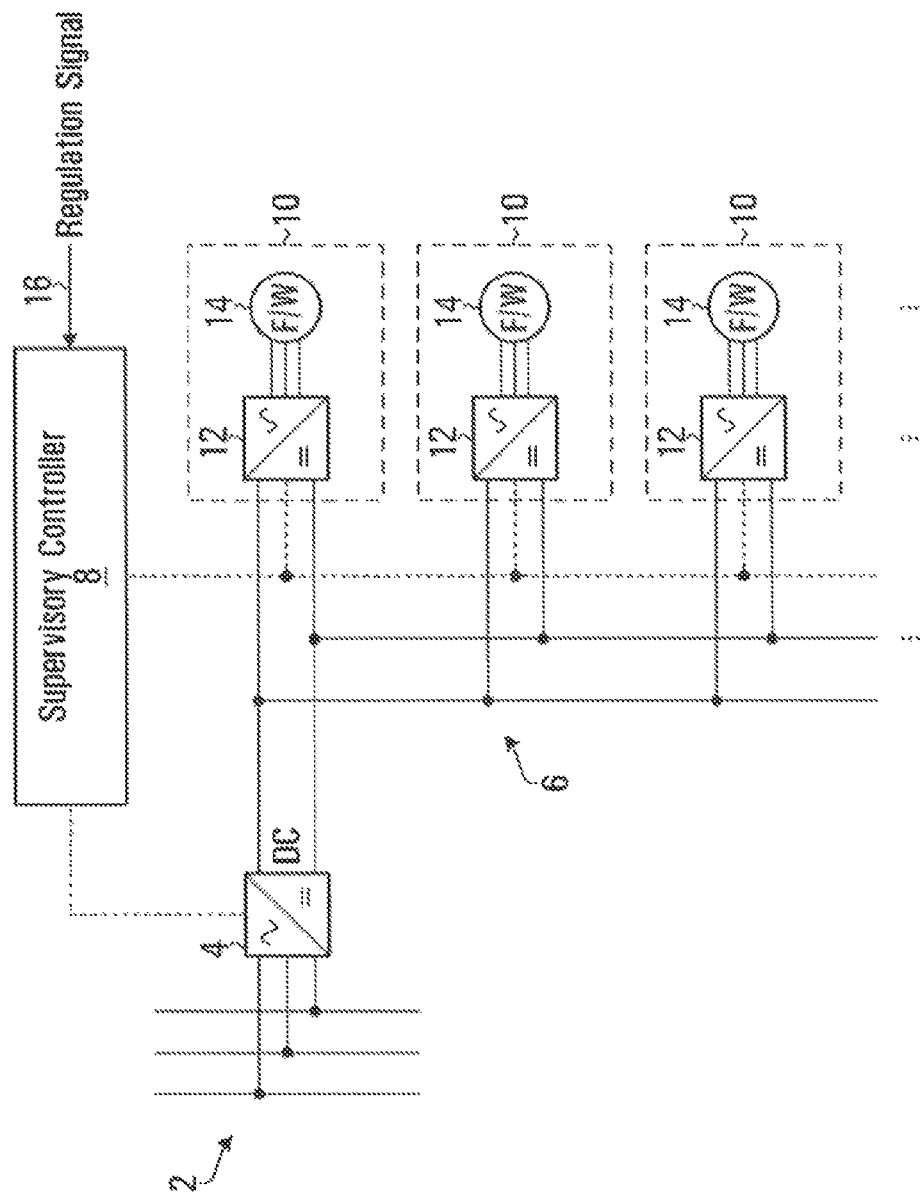
FIG. 1 is a block diagram schematically illustrating an energy storage system known in the art connected to an AC electricity grid.

FIG. 1 is a block diagram schematically illustrating a conventional flywheel energy storage. In the system of FIG. 1, the AC electricity grid (or a connection to it) is represented by a 3-phase AC bus 2. A power conditioning unit 4 is connected to the 3-phase AC bus 2, and enables bi-directional energy flow between the AC electricity grid and a high-voltage DC bus 6. A bank of energy storage units 10 is connected to the high-voltage DC bus 6. Each energy storage unit 10 includes a flywheel 14, and a flywheel controller/converter 12 to regulate the supply of power between the high-voltage DC bus 6 and the flywheel 14. In operation, a supervisory controller 8 interacts with each of the flywheel controller/converter 12 to control the flow of electrical power into and out of the energy storage system in accordance with a regulation signal 16 received from an AGC process of the AC electricity grid, for example. By this means, the energy storage system can selectively absorb or supply electrical power from or to the AC electricity grid so as to facilitate frequency regulation. In the power absorbing mode, the flywheel controller/converter 12 operates to absorb electrical power from the high-voltage DC bus 6, invert the absorbed power to AC, and feed the AC power to the flywheel 14. On the other hand, in the supplying mode, the flywheel controller/converter 12 absorbs electrical power from the flywheel 14 and converts the 3-phase AC power to DC on the high-voltage DC bus 6.

Figure 2:
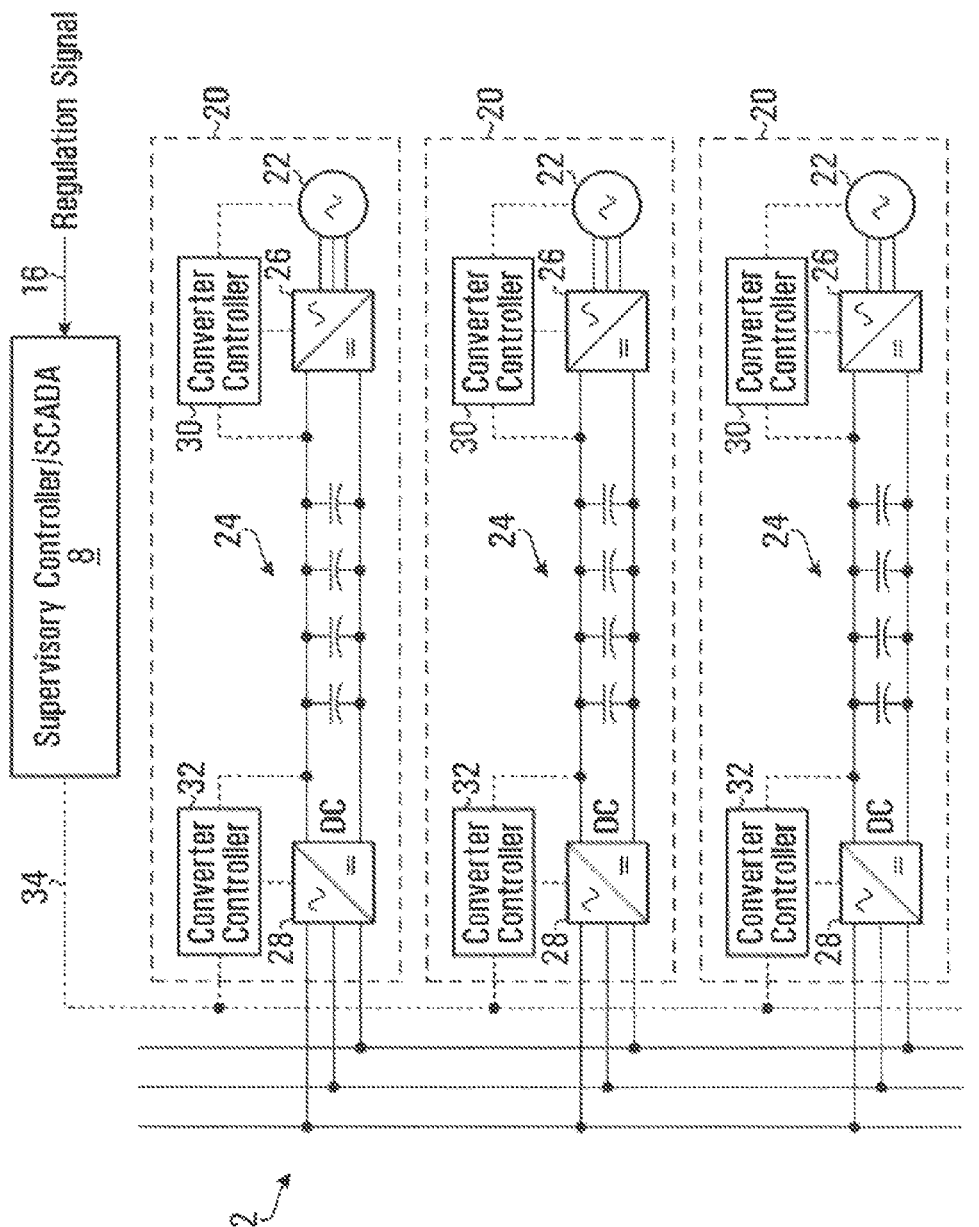
FIG. 2 is a block diagram schematically illustrating an energy storage system in accordance with a representative embodiment connected to an AC electricity grid.

Referring to FIG. 2, there is shown a system usable for power regulation in an AC electricity grid in accordance with one embodiment. In the embodiment of FIG. 2, the system comprises a set of one or more power regulation units 20 connected to a 3-phase AC bus 2 and controlled by a common supervisory controller 8.

In the illustrated embodiment, the 3-phase AC bus 2 may represent either a connection to the AC electricity grid or the AC electricity grid itself. Each power regulation unit 20 comprises a variable frequency AC source/sink 22 providing an AC energy store; a capacitor array 24 providing a DC energy store; a variable frequency AC/DC power converter 26 coupled between the AC source/sink 22 and the capacitor array 24, and a variable frequency AC/DC power converter 28 connected between the capacitor array 24 and the 3-phase AC bus 2.

The variable frequency AC source/sink 22 may be provided as any of a variety of devices capable of producing and/or absorbing variable frequency AC power. In some cases, the variable frequency AC source/sink 22 may be provided as a kinetic battery such as a flywheel energy storage device or a pumped water storage system (which uses water to rotate a generator to generate power). As will be appreciated, kinetic batteries are capable of sourcing (i.e. outputting) AC power in accordance with the total energy stored in the device, and sinking (i.e. absorbing) AC power within the available storage capacity of the device. In some embodiments, all of the power regulation units 20 are configured with the same type of variable frequency AC source/sink 22. In other embodiments, different types of variable frequency AC source/sink 22 may be employed in different ones of the power regulation units 20. Applicant's US Patent publication No. US 2011/0298293, published Dec. 8, 2011, discloses flywheel energy storage systems of a type that may be used for this purpose. The entire content of US Patent publication No. US 2011/0298293 is incorporated herein by reference.

The capacitor array 24 preferably comprises one or more capacitors configured to provide a highly responsive DC energy store. As is known in the art, capacitors are capable of sourcing and sinking electrical energy with very high transient power levels and very short response times, although their energy storage capability is limited relative to both the variable frequency AC source/sink 22 and conventional power generation units.

In combination, the capacitor array 24 and the variable frequency AC source/sink 22 enable a staged response to load changes in the AC electricity grid. In particular, the capacitor array 24 enables a very rapid initial response to a control signal, and then the slower responding variable frequency AC source/sink 22 sustains the required power sourcing or sinking operation for a longer duration of time.

Interaction between the capacitor array 24 and the variable frequency AC source/sink 22 is mediated by the variable frequency AC/DC power converter 26, under control of a converter controller 30, which may comprise an AC control PID loop. The converter controller 30 monitors the DC voltage across the capacitor array 24 and controls the variable frequency AC/DC power converter 26 and the variable frequency AC source/sink 22 to supply or absorb energy accordingly. The variable frequency AC/DC power converter 26 comprises both a rectifier and an inverter, so that the variable frequency AC source/sink 22 can operate in both energy sourcing and energy sinking modes of operation.

The converter controller 30 therefore operates to control the variable frequency AC/DC power converter 26 to manage the flow of energy between the variable frequency AC source/sink 22 and the capacitor array 24 in an effort to maintain the voltage across the capacitor array 24 within a predetermined range.

The converter controller 30 may operate in a power sourcing mode of operation, in which electrical energy from the variable frequency AC source/sink 22 is rectified and supplied to the capacitor array 24. For example, the converter controller 30 may control the variable frequency AC/DC power converter 26 to supply energy from the variable frequency AC source/sink 22 in order to maintain the DC voltage of the capacitor array 24 at or above a predetermined minimum level.

In addition to the energy sourcing mode of operation, the converter controller 30 may operate in an energy sinking mode of operation, in which DC energy from the capacitor array 24 is converted to a variable frequency AC power and supplied to the variable frequency AC source/sink 22. For example, the converter controller 30 may control the variable frequency AC/DC power converter 26 to supply energy to the variable frequency AC source/sink 22 in order to maintain the DC voltage of the capacitor array 24 at or below a predetermined maximum level.

As will be appreciated, both of the energy sourcing and energy sinking modes of operation are dependent on the available capacity of the variable frequency AC source/sink 22 to source or sink electrical energy. Accordingly, the converter controller 30 is preferably responsive to one or more signals indicative of the state of the variable frequency AC source/sink 22, and may enter a stand-by mode of operation based on the indicated state. For example, consider an embodiment in which the variable frequency AC source/sink 22 is provided as a kinetic battery. Kinetic batteries typically are capable of storing energy up to a predetermined maximum amount of energy. As such, the ability of the kinetic battery to source energy to the capacitor array 24 at any given time is dependent on the actual amount of energy stored in the battery at that time. Conversely, the ability of the kinetic battery to sink energy from the capacitor array 24 at any given time is dependent on the available storage capacity of the battery, that is, the difference between the actual amount of energy stored in the battery and the maximum amount of energy that the battery is capable of storing. Accordingly, when the actual amount of energy stored in the battery is below a predetermined minimum level, the converter controller 30 may enter a first stand-by mode, in which the variable frequency AC/DC power converter 26 is prevented from supplying any further energy to the capacitor array 24 from the variable frequency AC source/sink 22. Conversely, when the actual amount of energy stored in the battery is above a predetermined maximum level, the converter controller 30 may enter a second stand-by mode, in which the variable frequency AC/DC power converter 26 is prevented from supplying any further energy to the variable frequency AC source/sink 22 from the capacitor array 24.

Interaction between the capacitor array 24 and the 3-phase AC bus 2 is mediated by the variable frequency power converter 28 under control of a converter controller 32, which may comprise an AC control PID loop. The converter controller 32 is responsive to a control signal 34 from the supervisory controller 8, to select one of a power absorbing mode and a power supplying mode. In the power absorbing mode of operation, the power converter 28 is controlled to absorb electrical power from the 3-phase AC bus 2, rectify the absorbed power to DC, and feed the DC power to the capacitor array 24. On the other hand, in the supplying mode, the power converter 28 is controlled to absorb DC power from the capacitor array 24, convert the DC power to 3-phase AC, and supply to the 3-phase AC power to the 3-phase AC bus 2.

As may be appreciated, both of the power absorbing and power supplying modes of operation are dependent on the energy available from the capacitor array 24. This energy availability is approximately proportional to the DC voltage of the capacitor array 24. Accordingly, the converter controller 32 is preferably responsive to the capacitor array voltage in addition to the control signal 34.

For example, consider a case in which the control signal 34 requests the supply of power to the 3-phase AC bus 2. In this case, if the capacitor array voltage is above a predetermined lower limit, then the converter controller 32 selects the power supplying mode and controls the power inverter 28 to supply power to the 3-phase AC bus 2 from the capacitor array 24. If, on the other hand, the capacitor array voltage is (or drops) below the lower limit, then the converter controller 32 may select a stand-by node, and prevent (or stop) the supply of power to the 3-phase AC bus 2.

Conversely, consider a case in which the control signal 34 requests the absorption of power from the 3-phase AC bus 2. In this case, if the capacitor array voltage is below a predetermined upper limit, then the converter controller 32 selects the power absorbing mode and controls the power inverter 28 to supply power to the capacitor array 24 from the 3-phase AC bus 2. If, on the other hand, the capacitor array voltage is (or rises) above the upper limit, then the converter controller 32 may select a stand-by node, and prevent (or stop) the supply of power to the capacitor array 24.

Following the above description, it will be seen that the converter controller 30 and the converter controller 32 operate independently of each other, while using the capacitor array voltage to control the flow of power into (and through) the system. As a result centralized control of both the converter controller 30 and the converter controller 32 from the supervisory controller 8 is not required.

Figure 3:
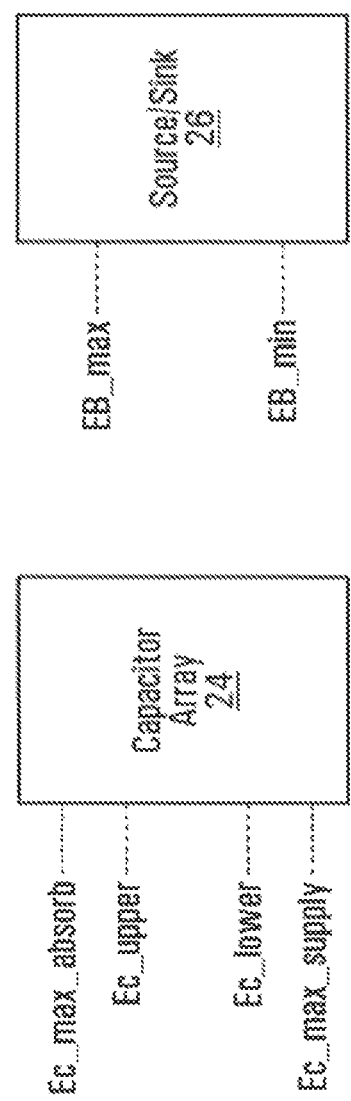
FIG. 3 is a schematic view illustrating aspects of the system of FIG. 2.

Possible control algorithms for converter controllers 30 and 32 may be based on the following thresholds schematically illustrated in FIG. 3:

Ec_min_supply—a minimum energy in the capacitor array for energy to be supplied from the array;

Ec_lower—a threshold energy in the capacitor array below which it would advisable to increase the energy in the capacitor array;

Ec_upper—a threshold energy in the capacitor array above which it would be advisable to decrease energy in the capacitor array;

EB_max_absorb—a maximum energy in the capacitor array for energy to be absorbed by the array;

EB_min—a minimum energy in the source/sink; and

EB_max—a maximum energy in the source/sink.

Converter controller 30 may store two thresholds for the capacitor array 24: Ec_lower and Ec_upper. Additionally, converter controller 30 may store the two thresholds for the source/sink 26: EB_min, and EB_max. Converter controller 30 may then operate under the following algorithm, where Ec is the energy in the capacitor array and EB is the energy in the source/sink:

```
while Ec < Ec_lower
    while EB > EBmin → supply energy to the capacitor array
    else stand-by
while Ec > Ec_upper
    while EB < EBmax → absorb energy from the capacitor array
```

The converter controller 32 may store the following two thresholds for the capacitor array 24: Ec_min_supply and EC_max_absorb. Converter controller 32 may then operate according to the following algorithm:

```
while receiving energy supply request from the supervisory controller
    while Ec > Ec_min_supply → supply energy to grid
    else stand-by
while receiving energy absorb request from the supervisory controller
    while Ec < Ec_max_absorb → absorb energy from grid
    else stand-by
```

It will be apparent from these control algorithms that while the energy of the capacitor array stays between Ec_lower and Ec_upper, the capacitor array will supply energy to, and absorb energy from, the grid without any energy flowing between the capacitor array and the source/sink. If, however, in supplying energy to the grid, the energy in the capacitor array drops below Ec_lower, controller 32 will be triggered to commence supplying available energy from the source/sink to the capacitor array. The difference between Ec_lower and Ec_min_supply may be chosen to be sufficiently large that it may be expected that in many situations, even given its slower response time, the source/sink will begin supplying energy to the capacitor array before the energy in the array drops below Ec_min_supply. Thus, the source/sink will assist in maintaining the energy in the capacitor array above the point where the capacitor array would cut out and cease supplying energy to the grid. Similarly, if, in absorbing energy from the grid, the energy in the capacitor array rises above Ec_upper, controller 32 will be triggered to have the source/sink commence absorbing energy from the capacitor array in order to assist in maintaining the energy in the capacitor array below the point where the capacitor array would cut out and cease absorbing energy from the grid.

In other embodiments, the variable frequency AC source/sink 22 is replaced with as a variable frequency generator such as a wind-turbine for example. As will be appreciated, variable frequency generators are capable of sourcing AC power at a variable frequency, but cannot sink and store energy for later use. Where source/sink 22 is replaced with a variable frequency generator, the variable frequency AC/DC power converter 26 is replaced by a rectifier, which operates to rectify AC power from the variable frequency AC source/sink 22 to a DC voltage, which is supplied to the capacitor array 24.

In other embodiments, the AC source/sink 22 is replaced with a DC source/sink, such as a battery array. In such instance, each variable frequency AC/DC power converter 26 is replaced by a switch which closes whenever energy is to be transferred to or from the capacitor array.

In other embodiments, the grid is a DC grid rather than an AC grid. In this instance, each variable frequency AC/DC power converter 28 is replaced by a switch which closes whenever energy is to be transferred to or from the grid.

In other embodiments, each capacitor array 24 is replaced by any other kind of capacitive system.

In other embodiments, each capacitor array 24 is replaced by a different kind of store of electrical energy, such as a battery array, provided the store has a faster response time than the source/sink.

Figure 4:
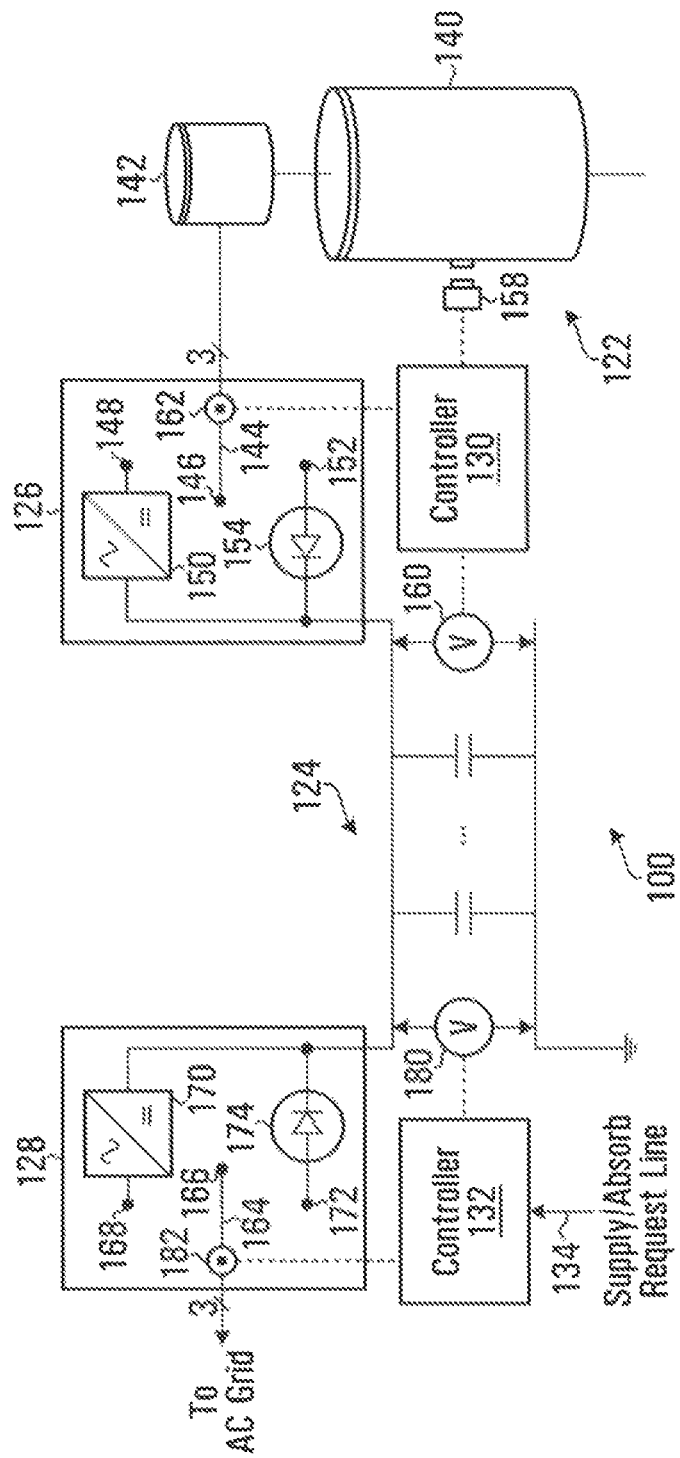
FIG. 4 is a schematic view illustrating an energy storage system in accordance with another representative embodiment.

FIG. 4 schematically illustrates a specific embodiment. Turning to FIG. 4, a system 100 for regulating power of an AC grid has a flywheel system 122 with a flywheel 140 connected to a generator 142. The AC output of the generator inputs an input side of a three way switch 144 of a power converter 126. One pole 146 of the switch is unterminated, one 148 connects to the output of the power converter 126 through a power inverter 150, and the third 152 connects to the output through a rectifier 154. The output of the power converter 126 inputs capacitive array 124. A controller 130 is input from a flywheel RPM sensor 158 and a capacitive array voltage sensor 160. The controller outputs a control signal to a switch controller which is schematically illustrated as a servo motor 162.

The AC grid inputs the input side of a three way switch 164 of a power converter 128. One pole 166 of the switch is unterminated, one 168 connects to the output of the power converter 128 through a power inverter 170, and the third 172 connects to the output through a rectifier 174. The output of the power converter 128 inputs capacitive array 124. A controller 132 is input from a supply/absorb request line 134 and a capacitive array voltage sensor 180. The controller 132 outputs a control signal to a switch controller which is schematically illustrated as a servo motor 182.

Controllers 130 and 132 may operate under the control of the algorithms described in conjunction with FIG. 3, where the energy of the capacitive array is represented by the voltages measured by voltage sensors 160, 180 and the energy of the flywheel is represented by the rotational speed (RPM) of the flywheel.

Two voltage sensors are illustrated in FIG. 4 to emphasize the independent operation of controllers 130 and 132 but both controllers could instead take a voltage signal from the same sensor. The two switches 144, 164 are schematically illustrated as mechanical switches but solid state switches may be substituted.

The embodiments described above are intended to be illustrative only and modifications will be apparent to those of skill in the art. The scope of the invention is therefore intended to be limited solely by the scope of the appended claims.

What is claimed is:

1. A power regulation system for an electrical grid comprising:
    a store of electrical energy;

a source of electrical energy, wherein an energy supply response time of the stole is faster than that of the source;

a first switch connecting the store to the source;

a second switch connected to the store at one side and having an opposite side for connection to the grid;

a first controller configured to monitor an amount of energy stored in the store and an amount of energy stored in the source and to selectively control the first switch to close to transfer energy from the source to the store provided that the amount of energy stored in the source is above a minimum source amount or to transfer energy from the store to the source provided that the amount of energy stored in the source is below a maximum source amount;

a second controller configured to monitor the amount of energy stored in the store and to control the second switch to close to transfer energy to the grid provided that the amount of energy in the store is above a minimum store threshold or to absorb energy from the grid provided that the amount of energy in the store is below a maximum store threshold, wherein the power regulation system operates in accordance with a regulation signal to transfer energy to the grid or to absorb energy from the grid.

2. The system of claim 1 wherein the second controller is also configured to control the second switch to open to cease transfer of energy from the store to the grid, if the amount of energy stored in the store falls below the minimum store threshold.

3. The system of claim 2 wherein the first controller is further configured to control the first switch to close to transfer energy from the store to the source when the amount of energy stored in the store exceeds an upper store threshold and when the amount of energy stored in the source is below the maximum source amount.

4. The system of claim 3 wherein the store is a capacitive store.

5. The system of claim 4 further comprising a voltage sensor measuring voltage across the capacitive store and wherein the first controller is responsive to the voltage sensor for monitoring the amount of energy stored in the capacitive store by monitoring a voltage of the capacitive store.

6. The system of claim 4 further comprising a voltage sensor measuring voltage across the capacitive store and wherein the second controller is responsive to the voltage sensor for monitoring the amount of energy stored in the capacitive store by monitoring voltage of the capacitive store.

7. The system of claim 3 wherein the electrical grid is an AC grid, the store stores DC energy, and the second switch comprises a power inverter and rectifier.

8. The system of claim 3 wherein the source stores AC energy and wherein the first switch comprises a power inverter and rectifier.

9. The system of claim 3 wherein the source is a kinetic battery.

10. The system of claim 9 wherein the kinetic battery is a flywheel.

11. The system of claim 10 wherein the first controller monitors the amount of energy stored in the source by monitoring the revolutions per minute of the flywheel.

12. A power regulation system for an AC grid, comprising:
a capacitive store able to supply energy on command within a first response time;
a first switch connected at one side to the capacitive store and for connection, at an opposite side, to a kinetic battery able, at least intermittently, to supply energy on command within a second response time, the first response time being faster than the second response time;
a second switch comprising a power inverter, the second switch connected at one side to the capacitive store and for connection at an opposite side to said AC grid;
a first controller connected to monitor voltage of said capacitive store and an amount of energy stored in the kinetic battery, the first controller being configured to control the first switch to close to transfer energy from the kinetic battery to the capacitive store, when the voltage of the capacitive store falls below a lower store threshold and the amount of energy stored in the kinetic battery is above a minimum battery amount in order to increase the voltage of the capacitive store above the lower store threshold;
a second controller to monitor the voltage of the capacitive store and intermittently receive a request to supply energy to the grid from the capacitive store, the second controller being configured to control the second switch to close to transfer energy from the capacitive store through the power inverter to the AC grid on receiving the request to supply the energy to the grid, and provided that the voltage of the capacitive store is above a minimum store threshold.

13. The system of claim 12 wherein the second switch further comprises a rectifier, the second switch being configured to have an open position, a first switch path through the power inverter, and a second switch path through the rectifier and wherein the second controller is also configured to control the second switch to close to transfer energy from the grid to the capacitive store through the rectifier, when a characteristic of power in the grid indicates a surplus of energy in the grid and the amount of energy stored in the capacitive store is below a maximum store threshold.

14. A power regulation system for an electrical grid, comprising:
a store of electrical energy able to supply energy on command within a first response time;
a first switch connected at one side to the store of electrical energy and for connection, at an opposite side, to a source of electrical energy able, at least intermittently, to supply energy on command within a second response time, the first response time being faster than the second response time;
a second switch connected at one side to the store and for connection at an opposite side to the electrical grid;
a first controller for monitoring an amount of energy stored in the store and an amount of energy stored in the source and for, controlling the first switch to close to transfer energy from the source to the store when the amount of energy stored in the store falls below a lower store threshold and the amount of energy stored in the source is above a minimum source amount in order to increase the amount of energy stored in the store to an amount above the lower store threshold;
a second controller for monitoring the amount of energy stored in the store and being configured to receive an indication of a characteristic of power in the grid and to control the second switch to close to transfer energy from the store to the grid provided that the characteristic of power in the grid indicates a need for additional energy in the grid and the amount of energy stored in the store is above a minimum store threshold.

15. The system of claim 14 wherein the second controller is also configured to control the second switch to close to transfer energy from the grid to the store provided that the characteristic of power in the grid indicates a surplus of energy in the grid and the amount of energy stored in the store is below a maximum store threshold.

16. The system of claim 15 wherein the first controller is further configured to control the first switch to close to transfer energy from the store to the source when the amount of energy in the store exceeds the maximum store threshold and when the amount of energy stored in the source is below a maximum source amount.

17. A method for regulating power on a grid comprising:
(a) in a first process:
  (i) monitoring an amount of energy stored in a store and an amount of energy stored in a source;
  (ii) transferring energy from the source to the store when the amount of energy stored in the store falls below a lower store threshold and the amount of energy in the source exceeds a minimum source amount in order to increase the amount of energy stored in the store to an amount at or above the lower store threshold;
(b) in a second process independent of the first process:
  (i) monitoring energy stored in the store; and
  (ii) transferring energy from the store to the grid on receiving an indication of a need for additional energy in the grid, provided that the amount of energy stored in the store exceeds a minimum store threshold.

18. The method of claim 17 wherein the second process further comprises, transferring energy from the grid to the store on receiving an indication of surplus of energy in the grid, if the amount of energy stored in the store is below a maximum store threshold.

19. The method of claim 18 wherein the first process further comprises:
  (iii) transferring energy from the store to the source when the amount of energy stored in the store exceeds the maximum store threshold and the amount of energy stored in the source is below a maximum source amount.

20. The method of claim 19, wherein the grid is an AC grid and the store is a capacitive store, and
  wherein transferring energy from the store to the grid involves a conversion of the energy from DC to AC.

21. The method of claim 19 wherein transferring energy from the grid to the store involves a conversion of the energy from AC to DC.

* * * * *

UNITED STATES PATENT AND TRADEMARK OFFICE
CERTIFICATE OF CORRECTION

| | | |
|---|---|---|
| PATENT NO. | : 8,803,363 B2 | Page 1 of 1 |
| APPLICATION NO. | : 13/863727 | |
| DATED | : August 12, 2014 | |
| INVENTOR(S) | : Veltri | |

It is certified that error appears in the above-identified patent and that said Letters Patent is hereby corrected as shown below:

In the Claims

Claim 1, column 9, line 2, please delete "stole" and insert --store--.

Signed and Sealed this
Tenth Day of February, 2015

Michelle K. Lee
*Deputy Director of the United States Patent and Trademark Office*